No. 751,665. PATENTED FEB. 9, 1904.
R. A. MAPLES.
REVERSING GEAR.
APPLICATION FILED JAN. 16, 1903.
NO MODEL.
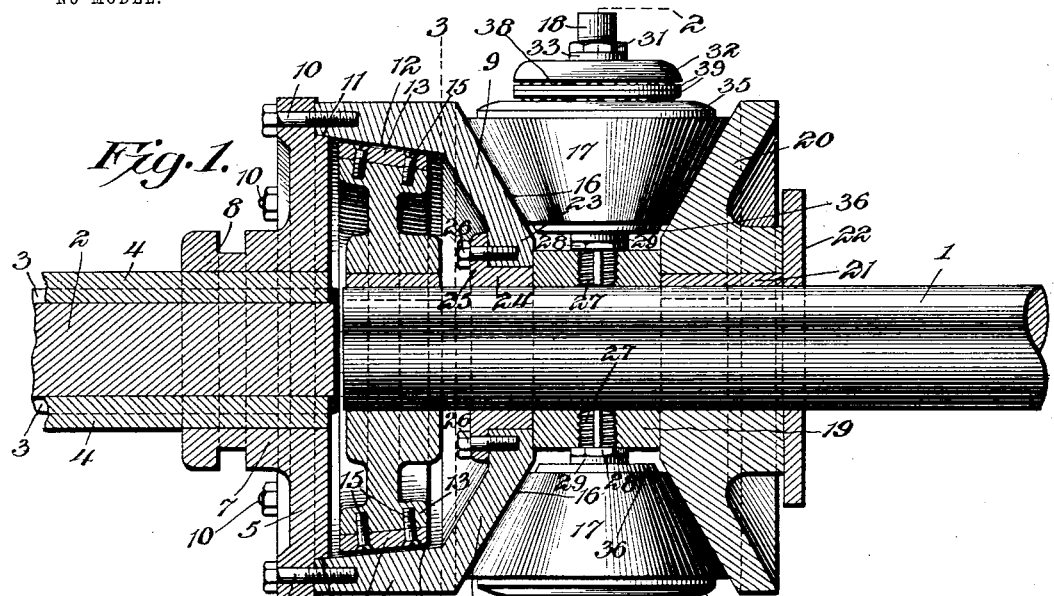
Fig. 1.
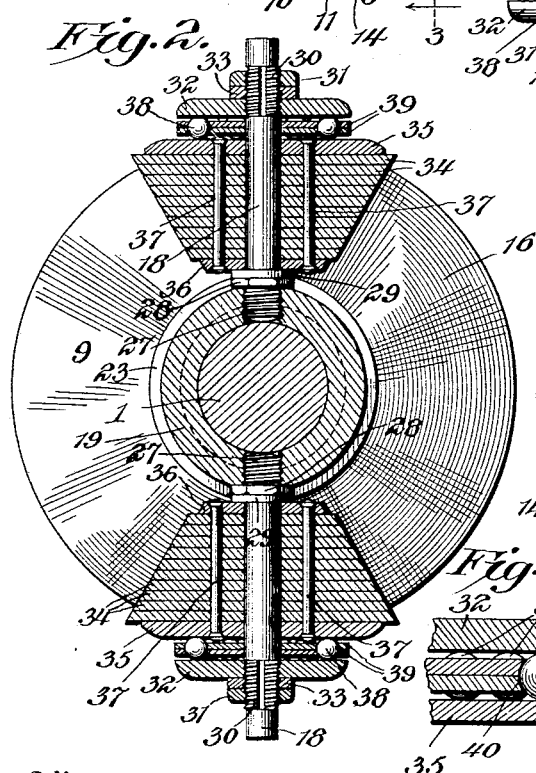
Fig. 2.
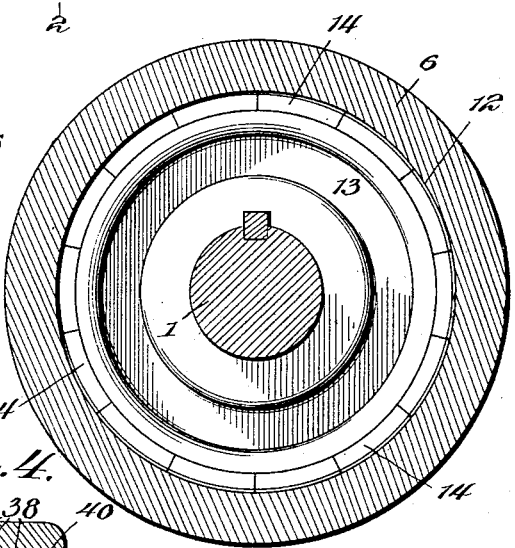
Fig. 3.
Fig. 4.
Witnesses
Howard W. Orr
N. F. Riley
R. A. Maples, Inventor,
By E. G. Siggers
Attorney
THE NORRIS PETERS CO., PHOTO-LITHO., WASHINGTON, D. C.

No. 751,665. Patented February 9, 1904.

UNITED STATES PATENT OFFICE.

RICHARD A. MAPLES, OF CLINTON, IOWA.

REVERSING-GEAR.

SPECIFICATION forming part of Letters Patent No. 751,665, dated February 9, 1904.

Application filed January 16, 1903. Serial No. 139,335. (No model.)

*To all whom it may concern:*

Be it known that I, RICHARD A. MAPLES, a citizen of the United States, residing at Clinton, in the county of Clinton and State of Iowa, have invented a new and useful Reversing-Gear, of which the following is a specification.

The invention relates to a reversing-gear for oil and gasolene engines for launches and other boats.

The object of the present invention is to improve the construction of reversing-gear for oil, gasolene, and other engines designed more especially for use on launches and various other boats and adapted to enable the same to be readily started, stopped, and reversed without stopping the engine.

A further object of the invention is to provide a reversing-gear of this character which will be simple and comparatively inexpensive in construction and which will possess great strength and durability and be adapted to be readily applied to the engine and propeller-shafts of a launch or other boat.

With these and other objects in view the invention consists in the novel construction and arrangement of parts hereinafter fully described, illustrated in the accompanying drawings, and particularly pointed out in the claims hereto appended, it being understood that changes in the form, proportion, and minor details of construction within the scope of the claims may be made without departing from the spirit or sacrificing any of the advantages of the invention.

In the drawings, Figure 1 is a longitudinal sectional view of a reversing-gear constructed in accordance with this invention. Fig. 2 is a transverse sectional view on the line 2 2 of Fig. 1. Fig. 3 is a similar view on the line 3 3 of Fig. 1. Fig. 4 is an enlarged detail sectional view illustrating the manner of mounting the antifriction-balls.

Like characters of reference designate corresponding parts in all the figures of the drawings.

1 designates a propeller-shaft arranged in alinement with an engine-shaft 2 of an oil, gasolene, or other engine, and the said engine-shaft is provided at diametrically opposite points with longitudinal grooves or feather-ways 3 for the reception of keys or feathers 4 for slidably connecting a disk 5 with the engine-shaft. The disk 5, which is connected with an exteriorly-arranged clutch member 6, as hereinafter explained, is provided with a central enlargement or hub portion 7, having an annular groove 8 for the reception of a shifting or reversing lever for moving the clutch member 6 to start, stop, or reverse the propeller-shaft. The clutch member, which consists of a shell or casing, is composed of an outer rim portion and an inclined or angularly-disposed radial portion 9. The rim portion is provided at its outer edge with an annular series of interiorly-threaded sockets for the reception of screws 10 for securing the clutch member to the disk 5. The screws 10, which are provided at their outer ends with wrench-receiving heads, pass through suitable perforations near the periphery of the disk, which is provided at its inner face with an annular recess for the reception of the adjacent edge of the clutch member. The recess 11 forms an inner annular shoulder for supporting the clutch member, and this shoulder is beveled to fit the beveled inner face 12 of the rim portion of the clutch member.

The rim portion of the exteriorly-arranged clutch member is tapered, as clearly illustrated in Fig. 1 of the drawings, and its beveled or inclined inner face is arranged to be frictionally engaged by an interiorly-arranged clutch member 13, keyed to the inner end of the propeller-shaft and preferably provided with a periphery 14, constructed of wood and consisting of separate pieces secured to the rim of the clutch member 13 by screws 15 or other suitable fastening devices; but the clutch member 13 may be constructed in any other desired manner, as will be readily understood. When the tapered rim portion of the exteriorly-arranged clutch member 6 is in engagement with the interiorly-arranged clutch member 13, the propeller-shaft is rotated in the same direction as the engine-shaft for driving a launch or other boat forward.

The radially-disposed portion 9 of the clutch member 6 is provided with an outer inclined or beveled engaging face 16, which is arranged to frictionally engage or mesh with exteriorly-arranged intermediate cone or bevel friction-pinions 17, mounted on stub-shafts 18, extending radially from the propeller-shaft and secured at their inner ends to a loose sleeve 19. The bevel friction-pinions are interposed between the clutch member 6 and a bevel friction-wheel 20, keyed to the propeller-shaft 1, as shown at 21, and arranged against a collar or flange 22. When the clutch member 6 is in engagement with the bevel friction-pinions, motion is communicated to the propeller-shaft through the pinions, whereby the propeller-shaft is reversed and is caused to rotate in a direction opposite to that in which the engine-shaft rotates. The radial or inclined portion 9 of the clutch member 6 is provided with an inner portion 23, arranged at right angles to the plane of the propeller-shaft and supported by a brass collar or sleeve 24, loosely arranged on the propeller-shaft and provided with a perforated flange 25, which is secured to the inner portion 23 of the clutch member by screws 26 or other suitable fastening devices. The flange forms a seat for the inner portion of the clutch member 6 and the brass sleeve provides a bearing for the same; but any other form of bearing may be provided for supporting the inner portion of the clutch member to form a solid structure.

The sleeve 19, which is loosely arranged on the propeller-shaft, is provided with threaded openings for the reception of the inner threaded ends 27 of the stub-shafts, which may be held against rotation by keys, wedges, or other suitable fastening devices and which are preferably provided with inner nuts 28, washers 29 being preferably interposed between the nuts 28 and the inner ends of the friction-pinions. The outer ends or portions of the stub-shafts are threaded at 30 for the reception of nuts 31 for securing bearing-disks 32 to the stub-shafts, washers 33 being preferably interposed between the outer nuts and the bearing disks or plates 32. The friction-pinions, which may be constructed in any desired manner and which are arranged in fixed relation with the wheel 20, are preferably composed of a series of layers or sections 34 of leather or other suitable material clamped between end plates 35 and 36 by suitable fastening devices 37, which pass through the end plates and the layers or sections, as clearly shown in Fig. 2.

In order to enable the friction-pinions to rotate frictionlessly, an annular series of anti-friction-balls 38 is interposed between their outer ends and the outer bearing plates or disks. These antifriction-balls are supported by a pair of plates or disks 39, having central openings for the reception of the stub-shafts and provided with annular series of oppositely-tapered openings 40, conforming to the configuration of the central portions of the balls and confining the same, as clearly illustrated in Fig. 4 of the drawings. These openings 40 are tapered outwardly from the inner faces of the plates or disks 39, and when they are placed over the balls from opposite sides of the same the balls are retained in the support or connecting device formed by the plates or disks, which may be secured together, if desired, by any suitable means. The friction-pinions are thrown outward by centrifugal force when the propeller-shaft rotates, and they are pressed outward by the clutch member 6 and the friction-wheel 20 when the propeller-shaft is reversely rotated. The anti-friction devices at the outer ends of the stub-shafts sustain this outward thrust of the friction-pinions, and thereby reduce the friction to a minimum.

The clutch member 6, which is shiftable longitudinally of the engine-shaft, is adapted to be readily engaged with either the clutch member 13 or the friction-pinions 17, and it is also adapted to be arranged at an intermediate point to stop the propeller-shaft. The clutch member 13, by means of which the propeller-shaft is driven forwardly, is housed within the clutch member, which forms a casing for housing the said clutch member 13.

It will be seen that the reverse clutch forms a simple, inexpensive, and efficient reversing-gear for oil, gasolene, and analogous engines for launches and various other vessels and that while it is especially designed and adapted for use in this relation it is capable of being advantageously employed in various other places where reversing mechanism is required.

What I claim is—

1. A device of the class described comprising an exteriorly-arranged clutch member having inner and outer engaging faces and connected with a driven shaft, an interiorly-arranged clutch member mounted on a shaft to be driven and arranged to engage the inner face of the exterior clutch member and housed within the latter, and friction-gearing connected with the shaft to be driven and having an intermediate gear arranged to engage the outer face of the exterior clutch member, substantially as described.

2. A device of the class described comprising an exterior clutch member consisting of a hollow shell or casing and having inner and outer engaging faces and connected with a drive-shaft, an interiorly-arranged clutch member housed within the hollow shell or casing and arranged to engage the inner face of the same and connected with the shaft to be driven, and friction-gearing also connected with the shaft to be driven and having an intermediate gear arranged to engage the outer face of the exterior clutch member, substantially as described.

3. A device of the class described comprising an exterior clutch member consisting of a hollow shell or casing and composed of an outer rim having an inner engaging face and a radial portion extending inward from the rim and provided with an outer engaging face, an interiorly-arranged clutch member housed within the shell or casing and arranged to engage the inner face of the exterior clutch member and mounted on the shaft to be driven, and friction-gears also connected with the shaft to be driven and having an intermediate gear arranged to engage the outer face of the exterior clutch member, substantially as described.

4. A device of the class described comprising an exterior clutch member consisting of an outer rim having an inclined or beveled engaging face and an inclined angularly-disposed radial portion extending inward from the rim and having an outer engaging face, an interior clutch member mounted on the shaft to be driven and arranged to be engaged by the clutch member, and friction-gears also connected with the shaft to be driven and arranged to engage the exterior clutch member, the latter being interposed between the friction-gears and the interior clutch member and housing the latter, substantially as described.

5. A device of the class described comprising an exterior clutch member consisting of an outer rim having an inner engaging face, and a radial portion extending inward from the rim and having an outer engaging face, a sleeve secured to and supporting the radial portion, a disk or plate secured to the rim and mounted on the drive-shaft, an interior clutch member mounted on the shaft to be driven and arranged to engage the inner face of the rim, and friction-gears also mounted on the shaft to be driven and arranged to engage the outer face of the radial portion of the exterior clutch member, the latter being interposed between the friction-gears and the interior clutch member and housing the latter, substantially as described.

6. In a device of the class described, the combination with drive and driven shafts, of a disk mounted on the drive-shaft, an exterior clutch member consisting of a shell or casing and secured to the disk and provided with inner and outer engaging faces, a bearing-sleeve loosely arranged on the driven shaft and supporting the inner edge of the exterior clutch member, an interiorly-arranged interior clutch member mounted directly on the driven shaft and housed within the exterior clutch member and arranged to be engaged by the inner face thereof, exteriorly-arranged intermediate friction-pinions carried by the driven shaft and arranged to engage the outer face of the exterior clutch member, and a friction-gear engaging the pinions and mounted on the driven shaft, substantially as described.

7. In a device of the class described, the combination with drive and driven shafts, of an exterior clutch member consisting of a hollow shell or casing and connected with the drive-shaft and provided with inner and outer engaging faces, an interiorly-arranged clutch member mounted directly on the driven shaft and arranged to engage the inner face of the shell or casing, a sleeve loosely mounted on the driven shaft, stub-shafts mounted on the sleeve, intermediate exteriorly-arranged friction-pinions mounted on the stub-shafts in position for engaging the outer face of the exterior clutch member, and a friction-wheel fixed to the driven shaft and arranged in fixed relation with the intermediate friction-pinions, substantially as described.

8. In a device of the class described the combination of a stub-shaft, a gear mounted on the stub-shaft, a series of antifriction-balls arranged at the outer end of the gear to receive the end thrust of the same, and a connecting device composed of two members or sections having oppositely-tapered openings receiving the balls, substantially as described.

9. In a device of the class described, the combination of a disk mounted on a drive-shaft and provided with a peripheral recess, an exterior clutch member consisting of an outer rim arranged in said recess, and a radial portion, a bearing-sleeve arranged on the shaft to be driven and provided with a flange forming a seat for the reception of the radial portion of the exterior clutch member, an interior clutch member mounted on the driven shaft and arranged to engage the exterior clutch member, and friction-gearing arranged to engage the exterior clutch member for communicating motion to the driven shaft, substantially as described.

10. In a device of the class described, the combination with drive and driven shafts, of an exterior clutch member slidably connected with the drive-shaft and consisting of an outer rim having an inner engaging face, and a radial portion extending inward from the rim to the driven shaft and supported on the same and having an outer engaging face, a gear-wheel fixed to the driven shaft, an intermediate gear mounted on the driven shaft and arranged in fixed relation with the said gear-wheel and in position to be engaged by the slidable clutch member, and an interiorly-arranged clutch member housed within the exterior clutch member and fixed to the driven shaft and arranged to be engaged by the inner face of the said rim, substantially as described.

11. In a device of the class described, the combination with drive and driven shafts, of a slidable exterior clutch member interlocked with one of the shafts and consisting of an outer rim having an inner engaging face, and a radial portion extending inward from the rim to the other shaft and supported on the same end provided with an outer engaging face, an interior clutch member arranged to engage the inner faces of the exterior clutch member, and friction-gearing for engaging the outer face of the exterior clutch member, substantially as described.

12. A device of the class described comprising a hollow slidable shell or casing having inner and outer engaging faces and designed to be mounted on a drive-shaft, a friction-gear designed to be mounted on a shaft to be driven, an intermediate gear arranged in fixed relation with the said gear and in position to be engaged by the outer face of the clutch member, and an interiorly-arranged clutch member designed to be mounted on the driven shaft and located within the hollow shell or casing and adapted to be engaged by the inner face thereof, substantially as described.

In testimony that I claim the foregoing as my own I have hereto affixed my signature in the presence of two witnesses.

RICHARD A. MAPLES.

Witnesses:
　W. O. PRATT,
　J. D. LAMB.